United States Patent [19]

Rieker

[11] Patent Number: 4,891,636

[45] Date of Patent: Jan. 2, 1990

[54] ELECTRONIC KEYLOCK SYSTEM

[75] Inventor: David A. Rieker, Cambridge, Ohio

[73] Assignee: NCR Corporation, Dayton, Ohio

[21] Appl. No.: 338,500

[22] Filed: Apr. 13, 1989

Related U.S. Application Data

[63] Continuation of Ser. No. 123,430, Nov. 20, 1987, abandoned.

[51] Int. Cl.[4] .......................... H04Q 1/00; H04Q 3/02

[52] U.S. Cl. ................................ 340/825.310; 70/278; 235/382.5; 361/172

[58] Field of Search ....................... 340/825.31, 825.34; 235/382, 382.5, 380, 441, 492; 70/278; 361/172

[56] References Cited

U.S. PATENT DOCUMENTS

| | | | |
|---|---|---|---|
| 3,134,254 | 5/1964 | Richard | 70/277 |
| 3,283,550 | 11/1966 | Bradway | 361/172 |
| 3,392,558 | 7/1968 | Hedin et al. | 70/277 |
| 3,587,051 | 6/1971 | Hevey | 340/164 R |
| 3,673,467 | 6/1972 | Eisenreich | 317/134 |
| 3,686,659 | 8/1972 | Bostrom | 340/274 |
| 3,787,714 | 1/1974 | Resnick et al. | 361/172 |
| 4,164,776 | 8/1979 | Nagayama | 70/278 X |
| 4,280,163 | 7/1981 | Osborne | 361/172 |
| 4,446,519 | 5/1984 | Thomas | 364/300 |
| 4,447,850 | 5/1984 | Asher | 361/172 |
| 4,507,944 | 4/1985 | Widen | 70/276 |
| 4,534,194 | 8/1985 | Aydin | 70/278 |
| 4,602,253 | 7/1986 | Kreft | 340/825.31 |
| 4,686,358 | 8/1987 | Seckinger et al. | 235/382 |

*Primary Examiner*—Ulysses Weldon

*Attorney, Agent, or Firm*—Wilbert Hawk, Jr.; Albert L. Sessler, Jr.

[57] ABSTRACT

An electronic keylock system comprises a key which includes a precision resistance, a receiver for receiving the key, an analog-to-digital converter coupled to the receiver for measuring the resistance of the precision resistance of the key, circuitry for controlling the analog-to-digital converter, decoding logic for receiving data from the analog-to-digital converter and decrypting the data to provide information with respect to the type of key applied to the receiver, and circuitry for controlling the decoding logic. Two system embodiments are disclosed, one of which employs separate components, and the other of which employs a microcontroller combining several functions.

14 Claims, 7 Drawing Sheets

ELECTRONIC KEYLOCK SYSTEM

- This is a continuation of co-pending application Ser. No. 123,430 filed on Nov. 20, 1987, now abandoned.

BACKGROUND OF THE INVENTION

Business terminals of the retail type, such as point of sale terminals, and of the financial type, such as teller terminals, are customarily provided with security devices such as locks to prevent access to the terminal by unauthorized persons. In addition, different types of access, to different portions of the terminal, may be appropriate for different classes of employees. For example, in the case of a point of sale terminal, a sales clerk may require access only to the keyboard and cash drawer of a terminal, while a supervisor may require access to additional portions of the terminal to alter certain types of transactions, and a programmer may require access to still other portions of the terminal to reprogram the terminal in accordance with changing requirements.

In providing a keylock system for restricting access to the terminal described above, certain considerations are particularly important. First, the keylock system must be very reliable, in order to prevent access to the terminal by unauthorized persons and to limit the degree of access for a particular class of user to that which is intended. Second, the cost of the keylock system should be kept as low as possible. Third, it would be desirable to have unique keying for particular establishments which use the terminal, and for particular classes of users or employees within the establishments. Fourth, it would be desirable to be able to identify the clerk by using a given key.

Various mechanical and electronic keylock systems have been employed with terminals in the past, with various approaches being taken to increase reliability and to decrease the cost of such systems. Recently, increased emphasis has been given to electronic locking systems which in many instances can provide increased sophistication and security at lower cost than mechanical arrangements. The use of resistors and other electrical components in keys of lock control circuits is shown in the prior art.

SUMMARY OF THE INVENTION

The present invention relates to an electronic keylock system, and more particularly relates to such a system employing a key having a resistive element and also employing a detection circuit which includes an analog-to-digital converter and a translation or decoding device.

In accordance with one embodiment of the invention, an electronic lock system comprises receiving means for receiving a key which includes precision resistor means having a tolerance of no greater than one percent to nominal value and a temperature tolerance equal to or less than 200 parts per million per degree Centigrade, and falling within a resistance range between 1,000 ohms and 750,000 ohms; analog-to-digital conversion means operatively coupled to said receiving means for measuring the resistance of the resistor means of said key and converting it to a digital value; first control means for controlling said analog-to-digital conversion means to cause it to measure the resistance of said resistor means at a desired time; programmable array logic means operatively coupled to said analog-to-digital conversion means for receiving data from said analog-to-digital conversion means as a digital value and decrypting said value to provide information on output means of said programmable array logic means as to the type of key which has been applied to said receiving means; and second control means for controlling the programmable array logic means.

In accordance with a second embodiment of the invention, an electronic lock system comprises receiving means for receiving a key which includes precision resistor means having a tolerance of no greater than one percent to nominal value and a temperature tolerance equal to or less than 200 parts per million per degree Centigrade, and falling within a resistance range between 1,000 ohms and 750,000 ohms; data processing means including analog-to-digital conversion means operatively coupled to said receiving means for measuring the resistance of said resistor means and converting it to a digital value and means for translating the output of the analog-to-digital conversion means to a form usable for security purposes by an associated terminal device; and control means for controlling the analog-to-digital conversion means to cause it to measure the resistance of said resistor means at a desired time.

It is accordingly an object of the present invention to provide a reliable relatively inexpensive electronic keylock system.

Another object is to provide an electronic keylock system employing a key which includes a precision resistor.

Another object is to provide an electronic keylock system employing an analog-to-digital conversion device and a translating or decoding device.

Another object is to provide an electronic keylock system employing an analog-to-digital converter and a programmable array logic device.

Another object is to provide an electronic keylock system capable of distinguishing among various types of keys.

With these and other objects, which will become apparent from the following description, in view, the invention includes certain novel features of construction and combinations of parts, a preferred form or embodiment of which is hereinafter described with reference to the drawings which accompany and form a part of this specification.

DETAILED DESCRIPTION

Figure 1:
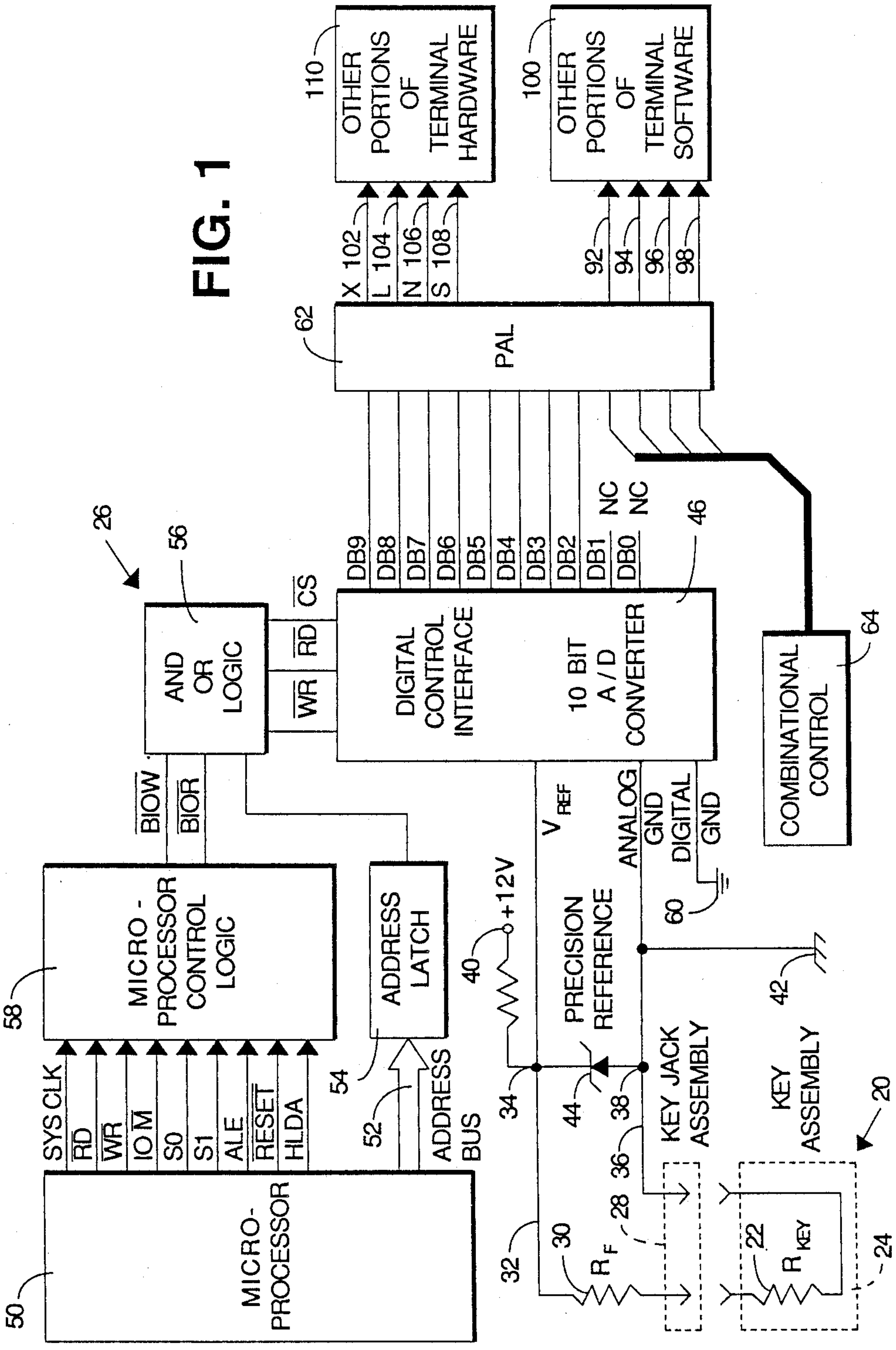
FIG. 1 is a block diagram of one embodiment of the electronic keylock system of the present invention.

Referring now to the embodiment of the invention shown in the diagram of FIG. 1, a key assembly 20 comprises a precision resistor 22 embodied in a case 24.

Figure 7:
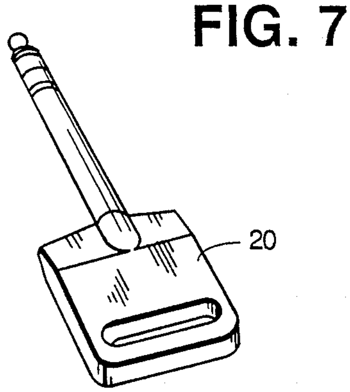
FIG. 7 is a perspective view of a key which may be employed in the present invention.
Figure 8:
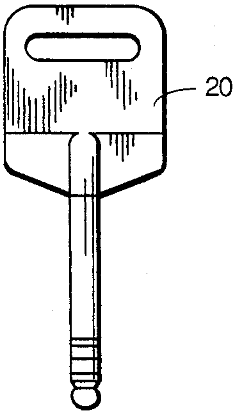
FIG. 8 is an elevation view of the key of FIG. 7.
Figure 9:
FIG. 9 is a plan view of the key of FIG. 7.

A precision resistor may be defined as a resistor which has a tighter tolerance to nominal value than does a standard resistor. A resistor having a one percent or tighter tolerance to nominal value and a temperature tolerance generally less than or equal to 200 parts per million per degree Centigrade is generally considered in the industry to be a precision resistor. The range of the resistors for the keys in the present invention has been determined to fall into the resistance range between 1,000 ohms and 750,000 ohms. The key assembly may have the external appearance shown in FIGS. 7, 8 and 9, for example, though different external configurations could be selected, if desired. One example of a structure which can be utilized as the key assembly 20 is a Switchcraft miniature telephone plug, manufactured by Switchcraft, Inc., Chicago, Ill.

The key assembly is used to provide locking and unlocking security for a device such as a point of sale terminal by operatively engaging it with a lock assembly, such as the electronic lock assembly shown in FIG. 1, and generally designated 26. Specifically, the key assembly 20 may engage a jack assembly or receptacle 28, for which a Switchcraft PC mount telephone jack may be employed.

The jack assembly 28 is connected on one side through a precision resistor 30, the specific resistance value of which will be dependent upon the value of the key resistor 22, and a conductor 32 to a circuit node 34, and is connected on a second side by a conductor 34 to a node 38. The node 36 is connected to a +12-volt precision source of potential 40, while the node 38 is connected to analog ground 42. A precision potential reference source may be defined as a source which will hold a voltage to one percent of nominal value, and which will hold that voltage over an extended temperature range. The temperature coefficient for a precision voltage reference is generally defined to be less than 50 parts per million per degree Centigrade. Connected between the nodes 36 and 38 is a precision reference zener diode 44, which may be of type LT1029ACZ, manufactured by Linear Technology Corp., Milpitas, Calif. The nodes 34 and 38 are also connected, respectively, to precision reference voltage (Vref) and analog ground inputs of a 10-bit analog-to-digital converter 46, which may be of type ADC1025, manufactured by National Semiconductor Corp., Santa Clara, Calif.

It will be seen that the circuit just described provides a means of measuring the resistance of the precision resistor 22 in the key assembly 20 by utilizing the analog-to-digital converter 46 to provide a digital value representative of the potential difference between inputs of said converter 46 which are coupled to the nodes 34 and 38.

Control of operation of the analog-to-digital converter 46 is provided by a microprocessor 50, which may be of type 8085, manufactured by Intel Corp., Santa Clara, Calif., and which customarily will be included in the system circuitry of the point of sale terminal with which the electronic lock assembly 26 is associated.

The microprocessor 50 provides an address for accessing the analog-to-digital converter 46 on an address bus 52. The address is latched in an address latch 54, which may be of a type manufactured by Texas Instruments, Dallas, Tex. The output of latch 54 is applied to an AND OR logic circuit 56, which may be of a type manufactured by Texas Instruments.

Figure 4A:
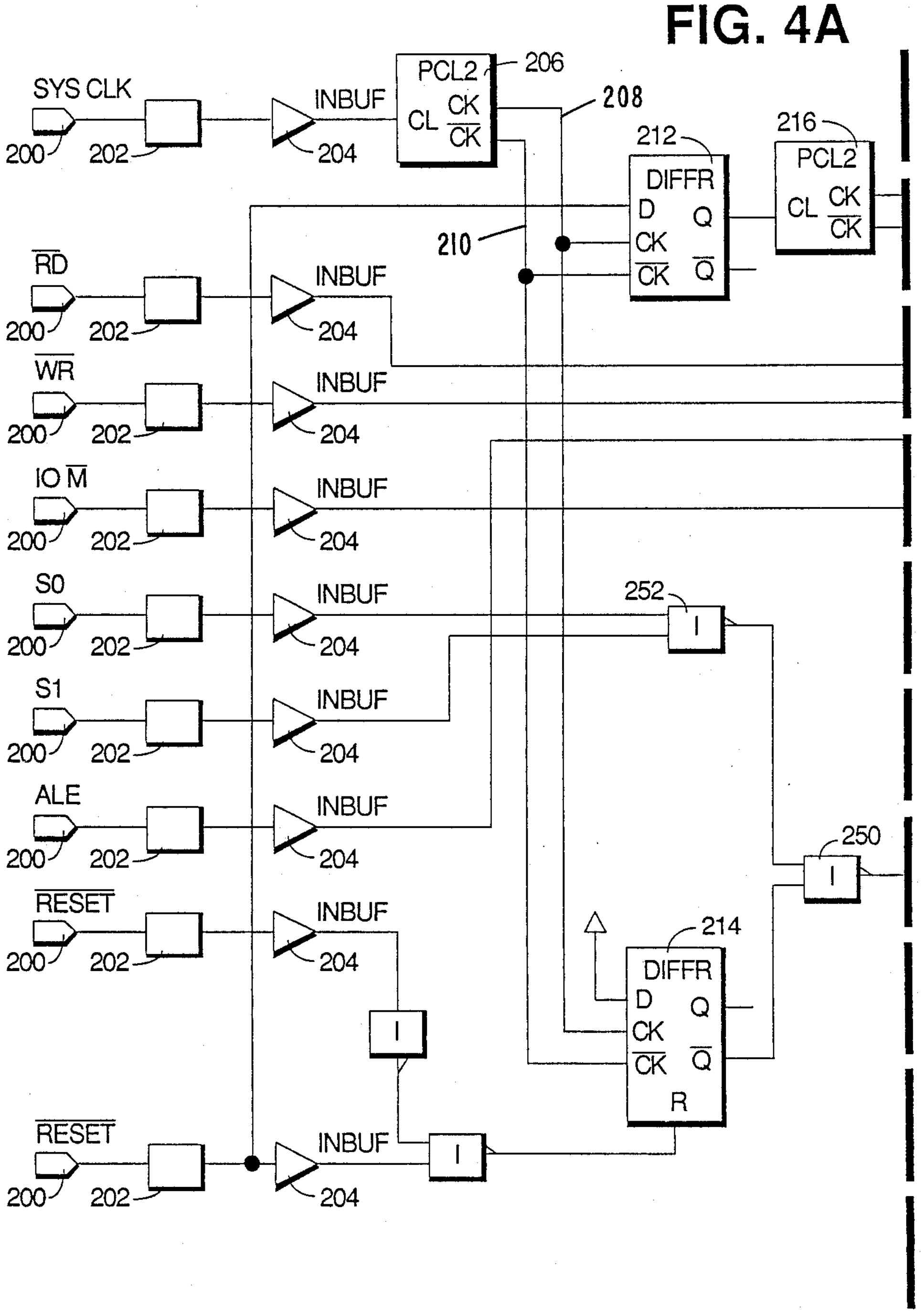
FIGS. 4A and 4B, taken together, constitute a diagram of the microprocessor control logic of FIG. 1.
Figure 4B:
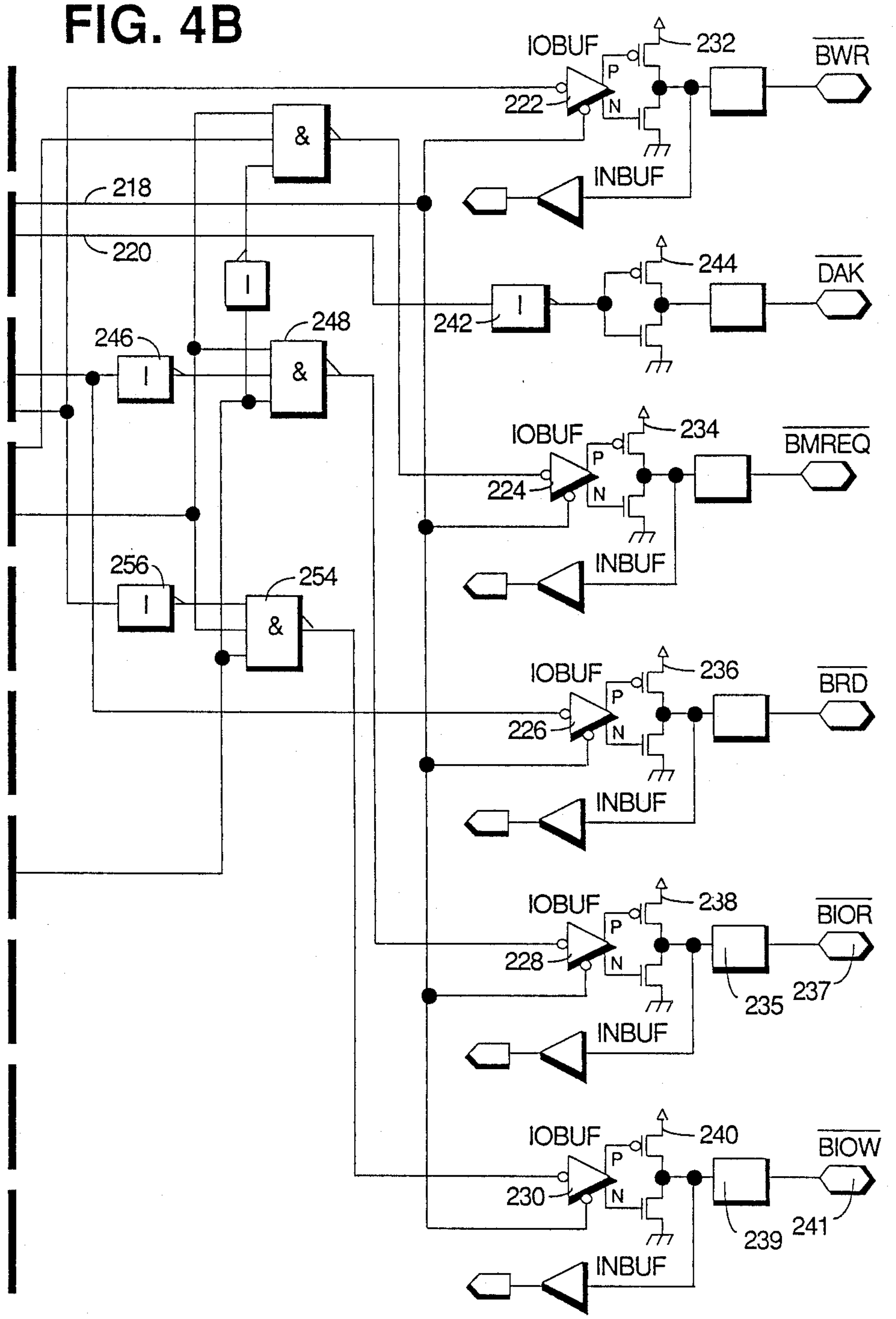

The microprocessor 50 also provides a plurality of signals SYS CLK, RD/, WR/, IO-M/, S0, S1, ALE, RESET/ and HLDA to various inputs of the microprocessor control logic circuit 58, shown in block form in FIG. 1 and in greater detail in FIGS. 4A and 4B. The signal SYS CLK is a system clock signal; the signal RD/ is a read signal; the signal WR/ is a write signal; the signal IO-M is an input signal from the microprocessor indicating that the next processor signal to be executed will be an I/0 or memory instruction; the status signal S1-S0 indicates that the next machine cycle will be a read, write, instruction fetch or a halt; the signal ALE is a latch enable signal; the signal RESET/ is an active low reset signal; and the signal HLDA indicates that the microprocessor has acknowledged a hold condition from another device which shares the processor system bus. These signals are conventional outputs from the microprocessor 50 and will not be described in greater detail.

The microprocessor control logic circuit 58 receives these signals and provides a number of output signals, of which the outputs BIOR/ and BIOW/, relating to reading and writing, are the only ones which are of specific interest in the present invention. The circuit 58 is embodied in the illustrated embodiment in a memory control chip, which may be of type 006-1007971, manufactured by NCR Corporation, Dayton, Ohio, but could also be implemented in the form of individual elements, and will be briefly described below in that form.

The various signals referred to above appear on terminations 200 on the left side of FIG. 4A. Each of said terminations 200 is coupled through a connecting pad 202 to an input buffer 204. The output of the input buffer 204 associated with the SYS CLK signal is applied to a clock drive 206 which provides both clock and inverse clock signals on lines 208 and 210 to two D-type flip-flops 212 and 214. An output from the flip-flop 212 is applied to another clock driver 216, and the clock and inverse clock outputs from said driver are applied on lines 218 and 220. The line 218 is connected to IO buffers 222, 224, 226, 228 and 230 which are associated with tri-state output drivers 232, 234, 236, 238 and 240, respectively. The line 220 is connected to an output inverter 242 associated with a tri-state output driver 244.

Since only the output signals BIOR/ and BIOW/ are of interest in the present invention, only the circuitry associated with these signals in FIGS. 4A and 4B will be described. It will be noted that the line carrying input signal RD/ is connected through an inverter 246 to one input of a NAND gate 248. A second input of that gate is connected to the input signal IO-M. The third input to the NAND gate 248 is taken from the output of a NOR gate 250. One input to the NOR gate 250 is taken from the output of the flip-flop 214, and the other input is taken from the output of a NOR gate 252, the inputs of which are connected to conductors on which the signals S0 and S1 appear. The output of the NAND gate 248 is connected to one input of the IO buffer 228 associated with the tri-state output driver 238, which is coupled through connecting pad 235 to a termination 237 on which the output signal BIOR/ appears. Operation of the tri-state output driver 238 is controlled by the clock signal emanating from the clock driver 216 and appearing on the conductor 218.

Similarly, the IO buffer 230 associated with the tri-state driver 240, which is coupled through a connecting pad 239 to a termination 241 for the output signal BIOW/, has an input connected to an output from a NAND gate 254 which also has inputs from the NOR gate 250 and the conductor associated with the input signal IO-M. A third input to the NAND gate 250 is an inverted (by inverter 256) signal WR/. Operation of the tri-state output driver 240 is controlled by the clock signal emanating from the clock driver 216 and appearing on the conductor 218.

The bus input/output read signal BIOR/ and the bus input/output write signal BIOW/, like the address signal from the address address latch 54, are applied to the AND OR logic circuit 56, which provides output signals CS/, RD/ and WR/. The signal CS/ is a chip select signal which is employed to select the analog-to-digital converter 46, while the RD/ and WR/ signals are read and write signals, respectively, to control the operation of the analog-to-digital converter 46, which reads the differential voltage between reference voltage and analog ground on a read command, and causes such information to be output on a write command. In addition to conductors for signals CS/, RD/, WR/, Vref and analog ground, the analog-to-digital converter is also connected to a digital ground 60.

The outputs from the analog-to-digital converter 46 are signals DB2 to DB9 inclusive which appear on correspondingly marked output conductors which are applied to corresponding inputs of a programmable logic array device, or PAL, 62, which may be of type 20L8, manufactured by Monolithic Memories, Santa Clara, Calif. The PAL 62 may be "read protected", if desired, to insure that the unauthorized reading of the fuse pattern therein cannot occur, and that the decryption of the PAL 62 will thus remain secure. It will be noted that signals DB0 and DB1 on correspondingly marked output lines of the analog-to-digital converter 46 are not used in the present invention.

Also provided as inputs to the PAL 62 are four outputs from a combinational control 64. These inputs to the PAL 62 control the translation of input signals to output signals to produce a given output signal or signals in response to a given input signal or combination of signals. The combinational control may take several forms.

Figure 2:
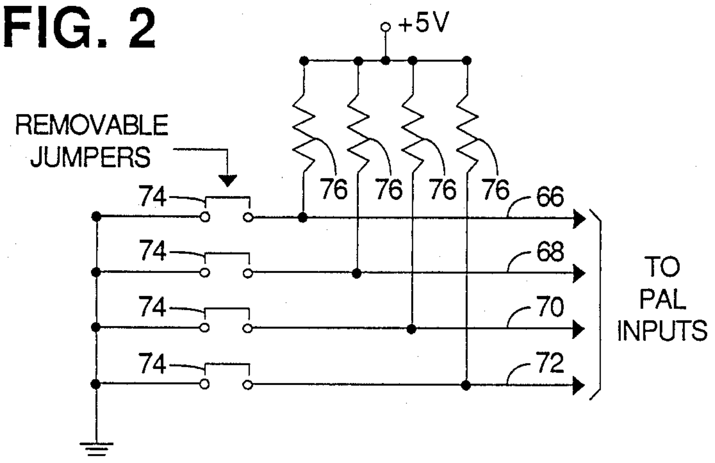
FIGS. 2 and 3 are diagrams of two alternative arrangements which may be used for the combinational control of FIG. 1.

One such form is shown in FIG. 2, in which four inputs 66, 68, 70, 72 are connected by conductors in parallel to a ground connection over a plurality of removable jumpers 74. Each conductor is also connected through a resistor 76 to a +5 volt source of potential. The logic levels of a given input will be at ground if the jumper 74 for the conductor associated with the input is retained in place, but will be at a logic level of +5 volts if the jumper is removed. A simple method is thus employed for providing a desired combination of logic control signals to the PAL 62.

Figure 3:
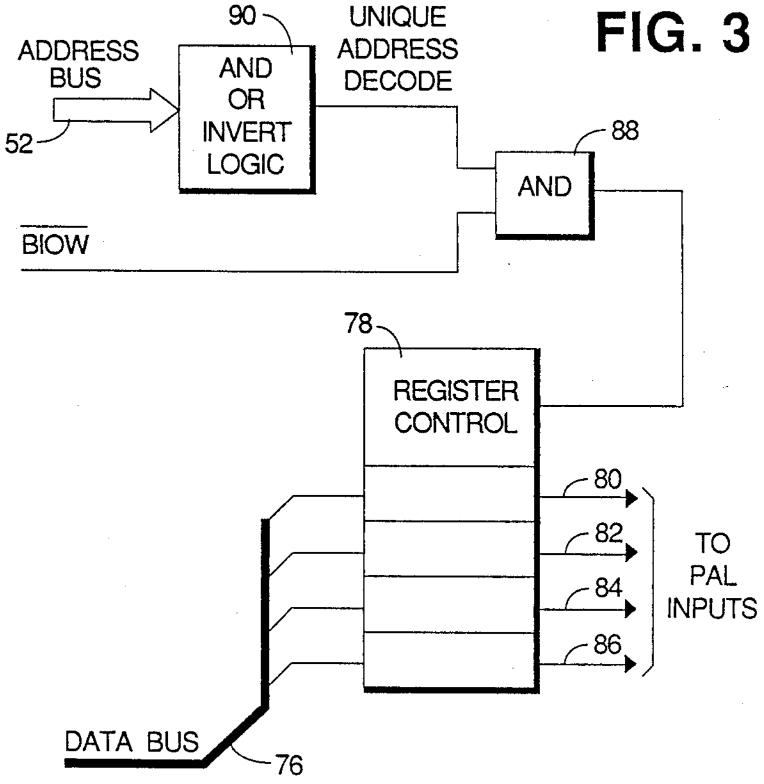

A second form of combinational control is shown in FIG. 3, in which input signals on a data bus 76 are applied to inputs of a register 78, which may be of type 74ACT574, manufactured by Samsung Semiconductor and Telecommunications Inc., San Jose, Calif. These signals are used to form output signals on conductors 80, 82, 84, 86 which are applied to the previously described inputs of the PAL 62. The manner in which the data signals are controlled or combined to produce output signals is determined by a signal applied to the register 78 on an output from an AND gate 88 which may be of a type manufactured by Texas Instruments. The AND gate 88 receives a first input from a conductor on which the previously described signal BIOW/ appears, and receives a second input from an AND-OR-INVERT circuit 90, which may be of a type manufactured by Texas Instruments, and which in turn receives inputs from the address bus 52 associated with the microprocessor 50. It will be seen that the signal from the AND gate 88 controls the register 78 to provide a combination of signals for control of the PAL 62.

As shown in FIG. 1, the outputs from the PAL 62 are divided into two groups. The lower group of outputs 92, 94, 96, 98 are applied to a block 100, representing other portions of terminal software. These signals may be utilized to control various terminal-associated software functions.

An upper group of outputs 102, 104, 106 and 108 provide security information indicating whether or not a key assembly 20 applied to the lock assembly 26 is a proper key assembly for unlocking the lock assembly 26. These signals may also convey additional information, such as the identity of the holder of the key, or the category of employee holding the key, such as clerk, supervisor or programmer. These signals are applied to a block 110, representing other portions of the terminal hardware, and most frequently are used to control the locking or unlocking of the terminal or of certain portions thereof. Thus, one key may unlock only the keyboard to permit operation thereof, while another key may unlock a portion of the terminal which permits alteration of the programming thereof.

As an example of use of signals appearing on the outputs 102, 104 106 and 108, the letters X, L, N and S are shown as applied to these respective outputs. The letter X in this example is considered to apply to the programming mode of the terminal, so that an appropriate signal on output 102 would unlock the terminal in such a manner as to permit an alteration of its programming. The letter L in this example may indicate a locked state in which the terminal cannot be operated. An inverse logic level on this line would conversely indicate that the terminal was unlocked and could be operated. Alternatively, the letter L could indicate a load condition in which a program could be entered into the terminal. The letter N in this example may indicate a normal condition under which, like the inverse L conditions, the machine may be operated. Finally, the letter S in this example may indicate a state in which a supervisor may have access to all or a part of the terminal, which access is denied, for example, to a clerk.

It will thus be seen that the key assembly 20 and the PAL 62 must, in effect, match. Thus, a matching set of key assemblies 20 and PAL 62 may be utilized, for example, for a given store or chain of stores, while a different matched set of key assemblies 20 and PAL 62 may be utilized for a different store or chain of stores.

Figure 5:
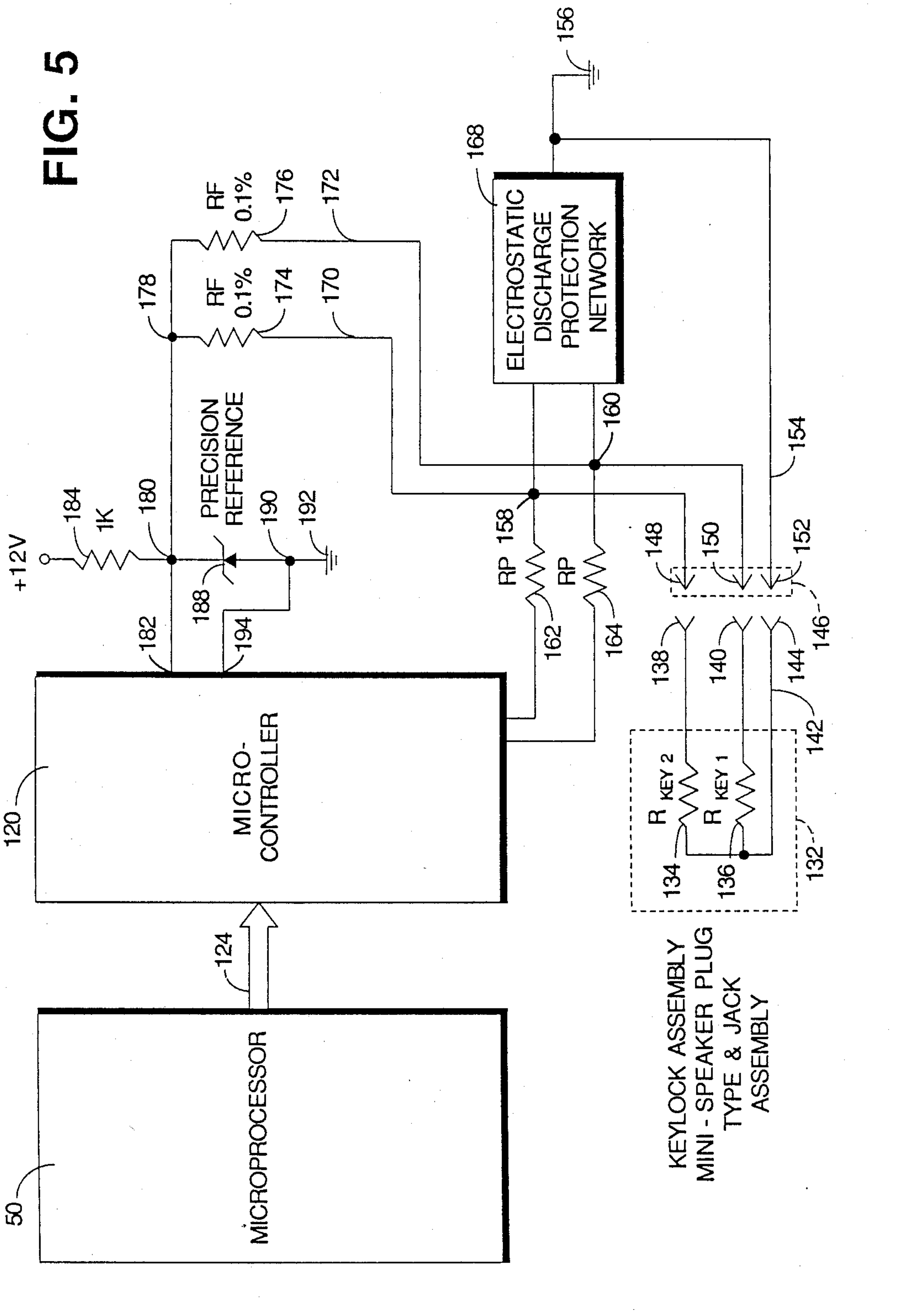
FIG. 5 is a block diagram of a second embodiment of the electronic keylock system of the present invention.

Another embodiment of the electronic keylock system of the present invention is shown in FIG. 5. This system employs a microcontroller 120 which functionally includes the equivalent of the analog-to-digital converter 46, the PAL 62 of the embodiment of FIG. 1, and the combinational control 64. This embodiment has the advantage of combining several separate components or circuits into one device for greater compactness and economy. It also provides a flexible and software programmable system. In the system of FIG. 1, the customer's keylock definition must be known at the time of building the system so that the PAL can be programmed accordingly when the system is built. The use of the microcontroller in the system of FIG. 5 simplifies the terminal keying configuration by allowing the customer access to software to alter the acceptable keycode information. The customer, rather than the manufacturer, can thus control key selection.

Figure 6:
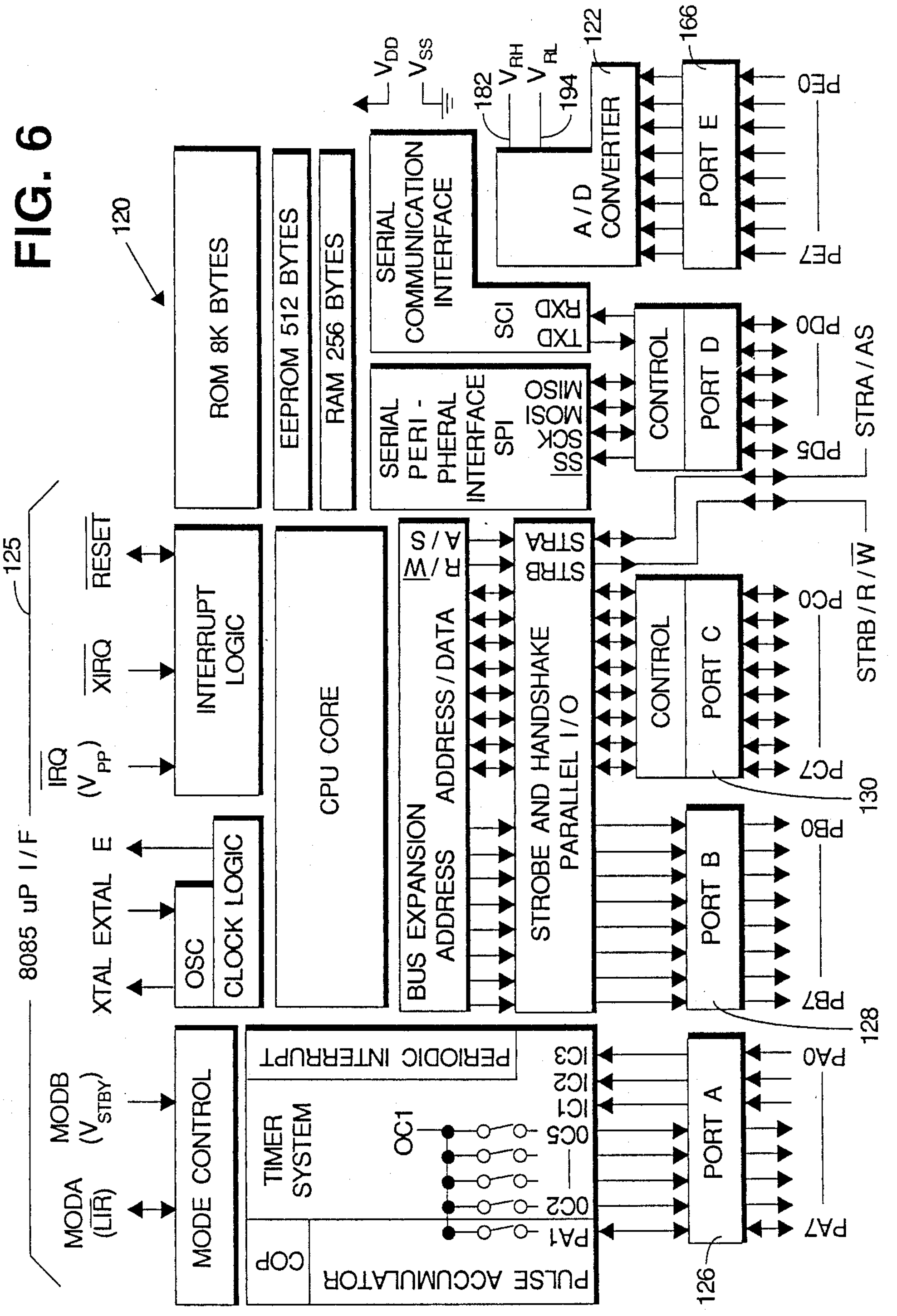
FIG. 6 is a block diagram of a microcontroller which can be employed in the system of FIG. 5.

One type of microcontroller 120 which can be employed in the present invention is the MC68HC11A8, manufactured by Motorola, Inc. A block diagram of this microcontroller is shown in FIG. 6. It will be noted that an A-D converter 122 is included in the microcontroller. The microcontroller is controlled by the 8085 microprocessor 50 via various signals transmitted over lines represented by the bus 124 in FIG. 5 and by the bracket 125 in FIG. 6. Certain lines of ports A, B and C, designated by reference characters 126, 128 and 130, respectively, provide outputs from the microcontroller 120 to other portions of the terminal hardware, as represented by block 110 of FIG. 1, and the terminal software, as represented by block 100 of FIG. 1.

As shown in FIG. 5, a key assembly 132 includes two precision resistors 134 and 136. These are associated with terminations 138 and 140, respectively, and a ground conductor 142 is associated with a third terminal 144. The key assembly 132 is engageable with a jack assembly or receptacle 146 having terminations 148, 150 and 152 corresponding to the terminations 138, 140 and 144. The termination 152 is connected by a conductor 154 to a ground connection 156. The terminations 148 and 150 are connected to nodes 158 and 160. Nodes 158 and 160 are connected through protective resistors 162 and 164 to connections of port E, designated 166, of the microcontroller 120, which, in turn, provides internal connecting paths to the A-D converter 122. An electrostatic discharge protection network 168 is preferably included and is connected to the nodes 158 and 160 and to the ground connection 156. The specific circuitry of such a network is not specifically disclosed herein, but it is believed that a suitable design could readily be developed by one skilled in the art. The protection network 168, together with the resistors 162 and 164, provides protection to the A-D converter 122 of the microcontroller 120.

Additional conductors 170 and 172 extend from the nodes 158 and 160 to a pair of 0.1% precision resistors 174 and 176. The specific resistance values of these resistors will be dependent upon the resistances of the key resistors 134 and 136. At their other ends, these resistors are connected to a node 178, and thence, through another node 180 to a $V_{RH}$ connection 182 of the A-D converter 122 in the microcontroller 120. The node 180 is connected through a 1000-ohm precision resistor 184 to a +12-volt precision source of potential 186. Also connected to the node 180 is one side of a 5.00 volt, +0.2% precision zener diode 188, which may be of type LT1029ACZ, manufactured by Linear Technology Corp., Milpitas, Calif. At its other side, the diode 188 is connected through a node 190 to a ground connection 192. A conductor extends from the node 190 to a $V_{RL}$ connection 194 of the A-D converter 122 in microcontroller 120.

The microcontroller 120 can be programmed in a well-known manner to internally decode output information from the A-D converter 122 and provide such information to ports 126, 128 and 130 in the same or similar form as output information is provided on the outputs 92, 94, 96, 98 and 102, 104, 106, 108 from the PAL 62 in the embodiment of FIG. 1. This information can then be utilized by portions of the associated point of sale terminal, such as portions 100 and 110 in the embodiment of FIG. 1.

While the forms of the invention shown and described herein are admirably adapted to fulfill the objects primarily stated, it is to be understood that it is not intended to confine the invention to the forms or embodiments disclosed herein for it is susceptible of embodiment in various other forms within the scope of the appended claims.

What is claimed is:

1. An electronic lock and key system comprising:

a plurality of key means including a plurality of different first precision resistor means;

receiving means for receiving said key means, said receiving means comprising a receptacle for said key means, a precision source of potential, second precision resistor means and precision reference means, said receiving means being capable of producing a plurality of output voltages representative of a plurality of first precision resistor means of different resistances in said plurality of different key means which are received by the receptacle of said receiving means;

analog-to-digital conversion means operatively coupled to said receiving means and capable of converting said plurality of output voltages representing different key means to a corresponding plurality of digital output values and having a plurality of outputs for outputting a plurality of different digital values greater than zero;

first control means for controlling said analog-to-digital conversion means to cause it to measure the resistances of the first precision resistor means of said key means which are operatively engaged with the receptacle of said receiving means, said first control means comprising control logic means; address latch means; microprocessor means coupled to said control logic means and said address latch means for applying inputs thereto; and additional logic means coupled to said control logic means and said address latch means to receive inputs therefrom and to provide output signals to said analog-to-digital conversion means;

programmable array logic means operatively coupled to said plurality of outputs of said analog-to-digital conversion means for receiving said digital output values from said analog-to-digital conversion means and decrypting said digital values to provide information on output means of said programmable array logic means relating to identification of different key means which are operatively engaged with the receptacle of said receiving means; and second control means for controlling the programmable array logic means.

2. The electronic lock and key system of claim 1, in which the programmable array logic means is read protected.

3. The electronic lock and key system of claim 1, in which the maximum potential across the key means is 6 volts.

4. The electronic lock and key system of claim 1, in which said resistor means comprises a precision one percent resistor contained within a male headphone type connector attached to a plastic handle.

5. The electronic lock and key system of claim 1, in which the output means of the programmable array logic means is operatively coupled to a point of service terminal.

6. The electronic lock and key system of claim 5, in which key means having resistor means of different resistances may be provided for use by different classes of key holders.

7. The electronic lock and key system of claim 6, in which said different classes include operators, programmers and supervisors.

8. The electronic lock and key system of claim 1, in which said second control means effectively alters the inputs to the programmable array logic means from the analog-to-digital conversion means.

9. An electronic lock system comprising:

receiving means for receiving a plurality of different keys which include a plurality of different first precision resistor means, said receiving means comprising a receptacle for said keys, a precision source of potential, second precision resistor means and precision reference means, said receiving means being capable of producing a plurality of output voltages representative of a plurality of first precision resistor means of different resistances included in different ones of said keys which are received by the receptacle of said receiving means;

analog-to-digital conversion means operatively coupled to said receiving means and capable of converting said plurality of output voltages to a corresponding plurality of digital output values and having a plurality of outputs for outputting a plurality of different digital values greater than zero;

first control means for controlling said analog-to-digital conversion means to cause it to measure the resistances of the first precision resistor means included in said keys which are operatively engaged with the receptacle of said receiving means, said first control means comprising control logic means; address latch means; microprocessor means coupled to said control logic means and said address latch means for applying inputs thereto; and additional logic means coupled to said control logic means and said address latch means to receive inputs therefrom and to provide output signals to said analog-to-digital conversion means;

programmable array logic means operatively coupled to said plurality of outputs of said analog-to-digital conversion means for receiving said digital output values from said analog-to-digital conversion means and decrypting said digital values to provide information on output means of said programmable array logic means relating to identification of different keys which are operatively engaged with the receptacle of said receiving means; and second control means for controlling the programmable array logic means.

10. The electronic lock system of claim 9, in which the programmable array logic means is read protected.

11. The electronic lock system of claim 9, in which the output means of the programmable array logic means is operatively coupled to a point of service terminal.

12. The electronic lock system of claim 9, in which keys having resistor means of different resistances may be provided for use by different classes of key holders.

13. The electronic lock system of claim 12, in which said different classes include operators, programmers and supervisors.

14. The electronic lock system of claim 9, in which said second control means effectively alters the inputs to the programmable array logic from the analog-to-digital control means.

* * * * *